United States Patent
Ward et al.

(10) Patent No.: US 7,112,025 B2
(45) Date of Patent: Sep. 26, 2006

(54) SELF-ATTACHING NUT

(75) Inventors: Richard P. Ward, Canton, MI (US); Harold T. Woods, Flat Rock, MI (US); John J. Vrana, Rochester Hills, MI (US); John M. Parker, Ann Arbor, MI (US); Kerry V. Boggs, South Lyon, MI (US)

(73) Assignee: Whitesell International Corporation, Taylor, MI (US)

( * ) Notice: Subject to any disclaimer, the term of this patent is extended or adjusted under 35 U.S.C. 154(b) by 0 days.

(21) Appl. No.: 11/262,263

(22) Filed: Oct. 28, 2005

(65) Prior Publication Data

US 2006/0062652 A1 Mar. 23, 2006

Related U.S. Application Data

(63) Continuation of application No. 10/612,455, filed on Jul. 2, 2003, now abandoned, which is a continuation-in-part of application No. 10/439,526, filed on May 16, 2003, now Pat. No. 6,994,500, which is a continuation-in-part of application No. 10/232,335, filed on Aug. 30, 2002, now Pat. No. 6,851,904.

(51) Int. Cl.
F16B 37/04 (2006.01)

(52) U.S. Cl. .................................. 411/180; 411/188
(58) Field of Classification Search ........ 411/179–181, 411/187, 188; 29/432.2
See application file for complete search history.

(56) References Cited

U.S. PATENT DOCUMENTS

| 1,919,552 | A | 7/1933 | Hasselquist |
| 3,213,914 | A | 10/1965 | Baumie et al. |
| 3,253,631 | A | 5/1966 | Reusser |
| 3,282,315 | A | 11/1966 | Zahodiakin |
| 3,736,969 | A | 6/1973 | Warn et al. |
| 3,810,291 | A | 5/1974 | Ladouceur |
| 3,910,331 | A | 10/1975 | Randall |
| 4,389,766 | A | 6/1983 | Capuano |
| 4,432,681 | A | 2/1984 | Capuano |
| 4,543,023 | A | 9/1985 | Capuano |
| 4,627,776 | A | 12/1986 | Pamer et al. |
| 4,637,766 | A | 1/1987 | Milliser |
| 4,690,599 | A | 9/1987 | Shinjo |
| 4,708,556 | A | 11/1987 | Pamer et al. |
| 4,810,143 | A | 3/1989 | Muller |
| 4,893,976 | A | 1/1990 | Milliser et al. |
| 4,911,592 | A | 3/1990 | Muller |
| 5,244,326 | A | 9/1993 | Henriksen |
| 5,251,370 | A | 10/1993 | Muller et al. |

(Continued)

FOREIGN PATENT DOCUMENTS

EP 0 561 715 A1 3/1993

*Primary Examiner*—Flemming Saether
(74) *Attorney, Agent, or Firm*—Howard & Howard Attnys.

(57) ABSTRACT

A self-attaching nut including a central pilot portion, a flange portion surrounding the pilot portion having an end face including an annular groove in the end face having inclined inner and outer side walls and a plurality of circumferentially spaced radial ribs integral with the outer side wall extending beyond a midportion of the bottom wall, but spaced from the inner side wall. In one embodiment, the top faces of the radial ribs is inclined to adjacent the inner side wall of the annular groove and in another embodiment, the radial inner ends of the ribs are spaced above the plane of the bottom wall and include an inwardly inclined face.

4 Claims, 3 Drawing Sheets

U.S. PATENT DOCUMENTS

| | | |
|---|---|---|
| 5,302,066 A | 4/1994 | Bieschke et al. |
| 5,335,411 A | 8/1994 | Muller et al. |
| 5,340,251 A | 8/1994 | Takahashi et al. |
| 5,423,645 A | 6/1995 | Muller et al. |
| 5,509,766 A | 4/1996 | Leuschner |
| 5,531,552 A | 7/1996 | Takahashi et al. |
| 5,549,430 A | 8/1996 | Takahashi et al. |
| 5,613,815 A | 3/1997 | Muller |
| 5,782,594 A | 7/1998 | Muller |
| 5,882,159 A | 3/1999 | Muller |
| 6,004,087 A | 12/1999 | Muller |
| 6,081,994 A | 7/2000 | Muller |
| 6,220,804 B1 | 4/2001 | Pamer et al. |
| 6,257,814 B1 | 7/2001 | Muller |
| 6,276,040 B1 | 8/2001 | Muller |
| D457,054 S | 5/2002 | Pamer et al. |
| 6,409,444 B1 | 6/2002 | Pamer et al. |
| 6,543,979 B1 | 4/2003 | Iwatsuki |
| 6,604,900 B1 | 8/2003 | Ikami et al. |
| 6,851,904 B1 | 2/2005 | Parker et al. |
| 2002/0172573 A1 | 11/2002 | Pamer et al. |
| 2002/0182032 A1 | 12/2002 | Anderson et al. |
| 2003/0039530 A1 | 2/2003 | Ross et al. |
| 2005/0265801 A1 | 12/2005 | Ward et al. |

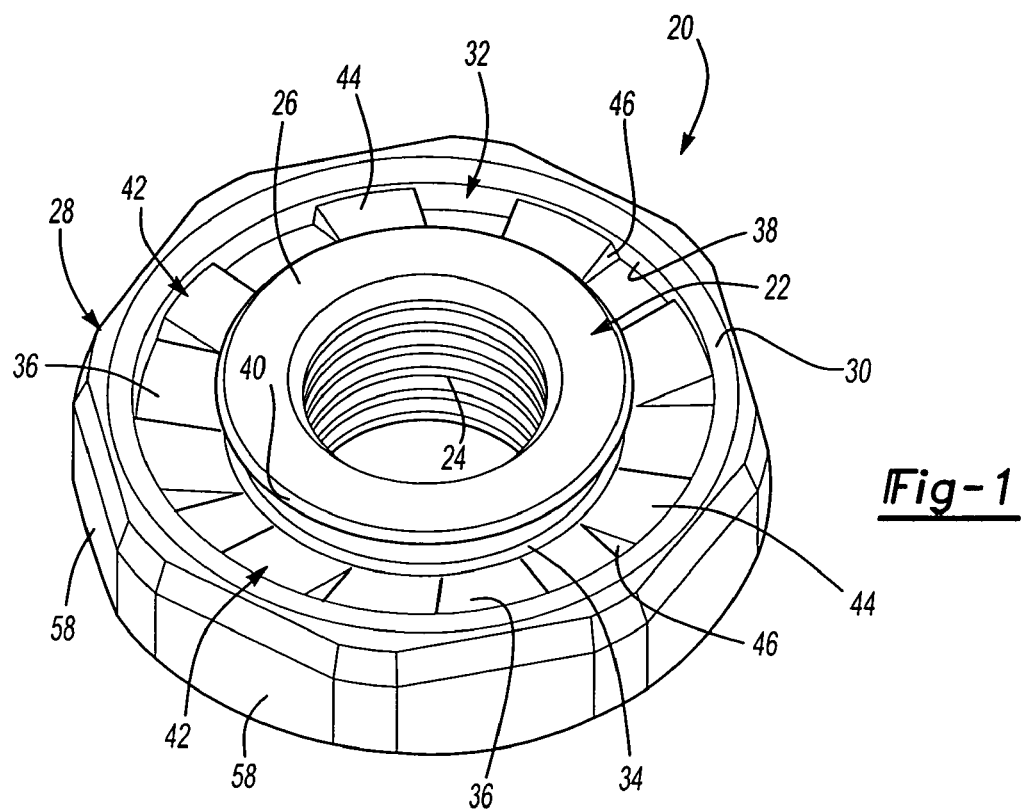

SELF-ATTACHING NUT

RELATED APPLICATIONS

This application is a continuation application of U.S. Ser. No. 10/612,455 filed Jul. 2, 2003, abandoned, which application was a continuation-in-part application of U.S. Ser. No. 10/439,526 filed May 16, 2003 now U.S. Pat. No. 6,994,500, which application was a continuation-in-part application of 10/232,335 filed Aug. 30, 2002 now U.S. Pat. No. 6,891,904, We have added no new subject matter to the specification of this application.

FIELD OF THE INVENTION

This invention relates to self-attaching female fasteners, particularly including pierce and clinch nuts, which may be formed by conventional cold header techniques, including secondary operations, and which provide improved resistance to rotation of the fastener and retention on a panel following installation.

BACKGROUND OF THE INVENTION

Self-attaching female fasteners, including pierce and clinch nuts, formed by cold header techniques and secondary press operations generally include a central pilot portion having a bore therethrough, an annular end face surrounding the bore, a flange portion surrounding the pilot portion including an end face, and an annular groove in the end face of the flange portion. The annular groove includes an annular inner side wall adjacent the pilot portion, a bottom wall spaced below the plane of the annular end face of the flange portion and an outer side wall extending from the bottom wall to the end face of the flange portion. To improve torque resistance or prevent rotation of the self-attaching female fastener on a panel following installation, the bottom wall of the groove may also include protuberances or ribs, including circular protuberances spaced from the inner and outer side walls of the groove, as disclosed, for example, in U.S. Pat. No. 5,531,552 assigned to the predecessor in interest of this application. U.S. Pat. No. 5,549,430, also assigned to the predecessor in interest of the assignee of this application, discloses a self-attaching nut of this type, wherein the bottom wall of the groove includes a plurality of spaced arcuate or semi-circular protrusions integral with the pilot portion. The prior art also includes radial ribs integral with the bottom wall of the groove and the inner and outer side walls, wherein the inner side wall of the annular groove or the outer wall of the pilot portion is inclined from the bottom wall radially outwardly. However, this self-attaching nut does not have sufficient retention on the panel for many applications. Finally, the prior art also includes self-attaching nuts having a "dovetail-shaped" annular groove, including small triangular protuberances integral with the bottom wall and the inner side wall and the bottom wall and the outer side wall. However, these small radial protuberances do not provide sufficient torque resistance for many applications.

There is therefore a need for a self-attaching fastener, particularly a pierce nut, having improved torque resistance and push-off strength. The self-attaching female fasteners of this invention provide these improvements as described below.

SUMMARY OF THE INVENTION

As set forth above, the self-attaching nut of this invention may be utilized as either a pierce nut or a clinch nut. The self-attaching nut of this invention includes a central pilot portion having a bore therethrough and an annular end face surrounding the bore. The annular end face of the pilot portion may be utilized to pierce an opening in a panel or the pilot portion may be received through a preformed opening in a panel. As will be understood by those skilled in this art, the self-attaching nuts are received by an installation tool or head affixed to one die member of a die press, generally the upper die member, having a reciprocal plunger received through a plunger passage. A die member or die button is located opposite the plunger passage in the lower die member having an annular die lip configured to be received within an annular groove in the self-attaching nut. Thus, during installation of the self-attaching nut in a panel, a self-attaching nut is received in the installation head and driven by the plunger against a panel supported on the die button. When used as a pierce nut, the annular end face of the pilot portion of the pierce nut pierces an opening in the panel and the projecting lip of the die button then deforms the panel surrounding the opening into the annular groove in the end face of the flange portion surrounding the pilot portion. When used as a clinch nut, the pilot portion is first received through the preformed opening and the annular projecting lip of the die button then deforms the panel metal surrounding the opening into the annular groove in the same manner. Where the bottom wall of the annular groove includes protuberances or ribs, the panel metal is deformed around the protuberances or ribs providing torque resistance. Thus, the self-attaching nut of this invention includes a flange portion surrounding the pilot portion including an end face and an annular groove in the end face preferably including an inner side wall adjacent the pilot, a bottom wall and an outer side wall. As thus far described, the self-attaching nut and method of installation is conventional.

In the preferred embodiment of the self-attaching nut of this invention, at least one of the inner and outer side walls of the annular groove is inclined toward the other side wall forming a restricted opening to the annular groove adjacent the annular end face of the flange portion surrounding the annular groove. In the preferred embodiment, the outer side wall of the annular groove is inclined toward the pilot portion, providing improved retention of the self-attaching nut on a panel. In a most preferred embodiment, the outer side wall of the annular groove is inclined toward the pilot portion and the inner side wall is inclined from the bottom wall of the annular groove toward the outer side wall forming, a "dovetail-shaped" annular groove providing further improved retention of the self-attaching nut on a panel, which is generally referred to as the "push-off" strength of the fastener. The push-off strength of the fastener is critical in many applications because a male threaded fastener is received through the panel into the bore of the fastener and threaded into the bore typically with a torque wrench in mass production applications. The flange portion includes an annular end surface surrounding the pilot portion, which prevents the fastener from being pushed through the panel. In a typical application, the bore will be prethreaded. However, the bore may also be unthreaded for receipt of a thread forming or thread rolling male fastener, such as a bolt.

The self-attaching nut of this invention includes a plurality of circumferentially spaced radial ribs integral with the bottom wall and preferably the outer side wall of the annular groove, wherein the outer side wall is inclined toward the pilot portion and the radial ribs extend beyond a midportion of the bottom wall of the annular groove, but spaced from the inner side wall. Each of the radial ribs includes a top face spaced above the bottom wall of the annular groove and opposed preferably planar side faces which prevent rotation of the self-attaching nut relative to a panel deformed into the annular groove against the bottom wall as described above. In one preferred embodiment of the self-attaching nut of this invention, the top face of the radial ribs are rectangular and inclined from the outer side wall of the annular groove toward the bottom wall and the top face extends to adjacent the inner side wall of the annular groove. In this embodiment, the bottom wall of the groove extends generally perpendicular to the axis of the bore through the pilot portion and the top faces of the radial ribs extend to or adjacent the junction of the inner wall and the bottom wall of the annular groove, providing optimum torque resistance. It should also be noted that this embodiment reduces the likelihood of distortion of the thread cylinder of the bore through the central pilot portion, but assures substantially complete filling of the undercut formed by the inclined inner side wall of the annular groove, particularly when compared to self-attaching nuts having a radial rib integral with both the inner and outer side walls of the groove and smaller radial ribs which do not extend beyond the midportion of the bottom wall of the annular groove.

In another preferred embodiment of the self-attaching nut of this invention, the radial ribs are integral with either the inner or side walls of the annular groove, and the top face of the radial ribs extend generally parallel to the bottom wall of the groove. The radial ribs further include an inwardly inclined end portion, spaced from the opposed side wall forming an undercut which receives panel beneath the undercut, further improving the push-off strength of the fastener and panel assembly. As will be understood, however, the top face may also be inclined as described above. In the disclosed embodiments, the top faces of the radial ribs are generally rectangular and the bottom wall of the annular groove is substantially perpendicular to the axis of the bore through the pilot portion, such that the bottom wall between the radial ribs is trapezoidal having a smaller circumferential width adjacent the pilot portion.

The self-attaching nuts disclosed herein have substantially improved push-off strength and torque resistance, permitting the use of the self-attaching nut of this invention in applications requiring improved performance, such as automotive seat and seat belt anchors, etc. Other advantages and meritorious features of the self-attaching nut of this invention will be more fully understood from the following description of the preferred embodiments, the appended claims and the drawings, a brief description of which follows.

BRIEF DESCRIPTION OF THE DRAWINGS

FIG. 1 is a top plan or perspective view of one embodiment of the self-attaching nut of this invention;

FIG. 2 is a top view of the self-attaching nut shown in FIG. 1;

DESCRIPTION OF THE PREFERRED EMBODIMENTS

Figure 3:
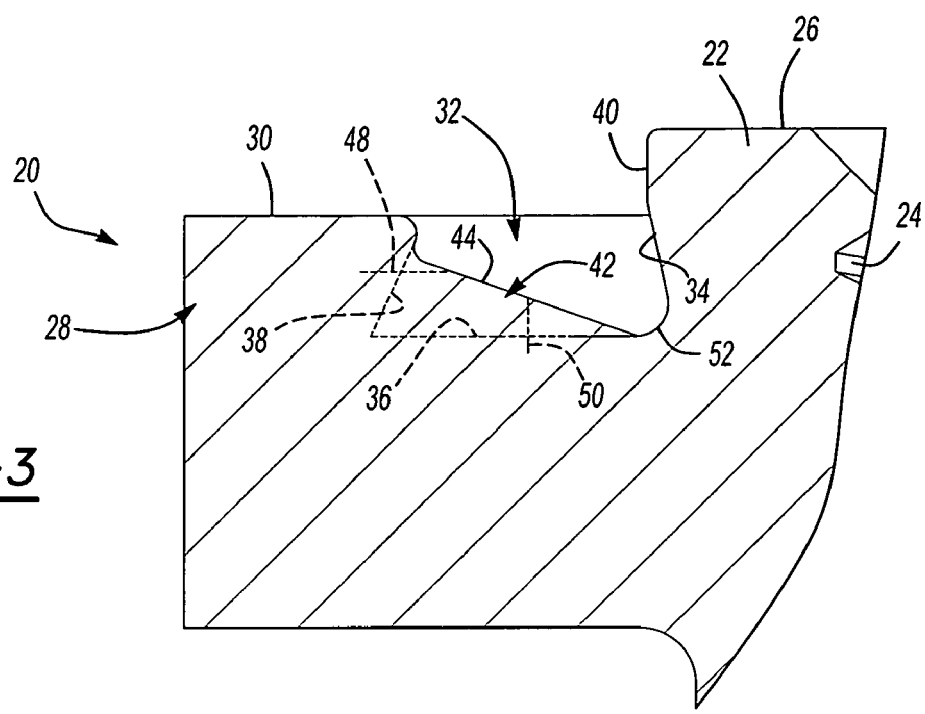
FIG. 3 is a partial side cross-sectional view of the self-attaching nut shown in FIGS. 1 and 2 through one of the radial ribs.

This application discloses two alternative embodiments of a self-attaching female fastener or nut of this invention. However, as will be understood by those skilled in this art, the disclosed embodiments are illustrative only and do not limit further embodiments based upon this disclosure, except as set forth in the appended claims. FIGS. 1 to 3 illustrate one preferred embodiment of a self-attaching female fastener or nut 20 which, as described above, may be formed by conventional cold forming or cold heading techniques, possibly including supplemental or secondary operations. The self-attaching nut 20 may be utilized as either a pierce nut or a clinch nut as described above. The disclosed embodiment of the self-attaching nut 20 includes a central pilot portion 22, a bore 24 extending through the pilot portion and an annular end face 26 surrounding the bore 24. The bore 24 may be threaded as shown or unthreaded for receipt of a self-tapping or thread rolling male fastener. The self-attaching nut 20 further includes an annular flange portion 28 surrounding the pilot portion 22 having an annular end face 30 and an annular groove 32 defined in the annular end face 30 surrounding the pilot portion 22. The annular groove 32 includes an inner side wall 34 adjacent the pilot portion 22, a bottom wall 36 and an outer side wall 38. As best shown in FIG. 3, the inner side wall 34 in this embodiment is inclined outwardly from the bottom wall 36 and the outer side wall 38 is inclined radially from the bottom wall 36 toward the pilot portion forming a dovetail-shaped annular groove. As set forth above, a dovetail-shaped groove provides superior push-off strength. However, as set forth above, it would also be possible to incline only one of the inner and outer side walls 34 and 38, respectively, preferably the outer side wall 38, where less performance is required. Where the self-attaching nut is utilized as a pierce nut, as described above, the annular end face 26 of the pilot portion 22 is preferably planar and spaced above the plane of the annular end face 30 of the flange portion 28 as best shown in FIG. 3 and the upper outer surface 40 of the pilot portion is preferably cylindrical as shown in FIG. 3 to provide columnar support for the end face 26 of the pilot portion during the piercing operation described above. In this preferred embodiment, the bottom wall 36 of the annular groove 32 extends substantially perpendicular to the axis of the bore 24. However, as will be understood by those skilled in this art, the bottom wall will be inclined at a relatively small angle, such as two to three degrees, to permit removal of the self-attaching nut from the die member used to form the bottom wall 36 of the groove.

This embodiment of the self-attaching nut 20 further includes a plurality of circumferentially spaced radial ribs 42, each having a top face 44 and opposed side faces 46. In this preferred embodiment, the radial ribs 42 are integral with the outer side wall 38 of the annular groove 32 and the top faces are inclined from the outer side wall 38 to the bottom wall 36, but spaced from the inner side wall 34 as best shown in FIG. 3. In the disclosed preferred embodiment, the radial ribs 42 are integrally joined to the outer side wall 38 above a midportion 48 and the radial ribs extend radially beyond a midportion 50 of the bottom wall as shown in FIG. 3. In a more preferred embodiment, the top face 44 extends to or adjacent the junction 52 of the inner side wall 34 and the bottom wall 36, providing optimum torsion resistance when installed on a panel without distorting the thread cylinder 24. That is, the panel will be deformed against the inwardly inclined top faces 44 of the radial ribs 42 as the panel is deformed into the annular groove 32 and against the bottom wall 36, which assures deformation of the panel beneath the outwardly inclined inner side wall 34 improving push-off strength without distortion of the threads 24. As best shown in FIGS. 1 and 2, the top faces 44 of the radial ribs 42 in this embodiment are rectangular, the side faces 46 are triangular and the bottom wall 36 between the radial ribs 42 is trapezoidal having a small circumferential width adjacent the pilot portion 22. As described above, the self-attaching nut 20 may be utilized as a pierce or clinch nut. When utilized as a pierce nut, the annular end face 26 of the pilot portion 22 is driven against a panel supported on a die member (not shown), piercing the panel and the panel surrounding the pierced opening is then driven into the annular groove 32 by an annular clinching lip, which drives the panel against the bottom wall 36 and the inclined surfaces 44 of the radial ribs 42, forming a secure installation, wherein the self-attaching nut 20 is prevented from rotating on the panel by the triangular side faces 46 of the radial ribs 42.

Figure 4:
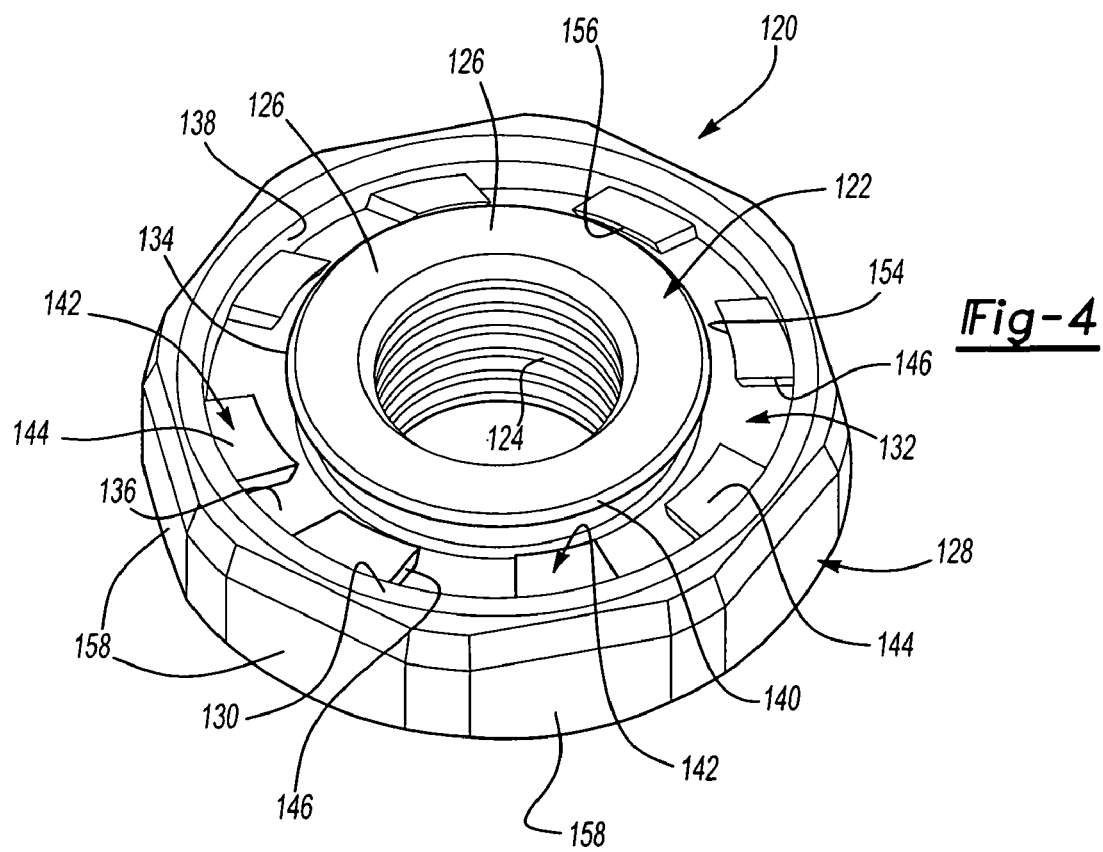
FIG. 4 is a top perspective view of an alternative embodiment of the self-attaching nut of this invention.
Figure 5:
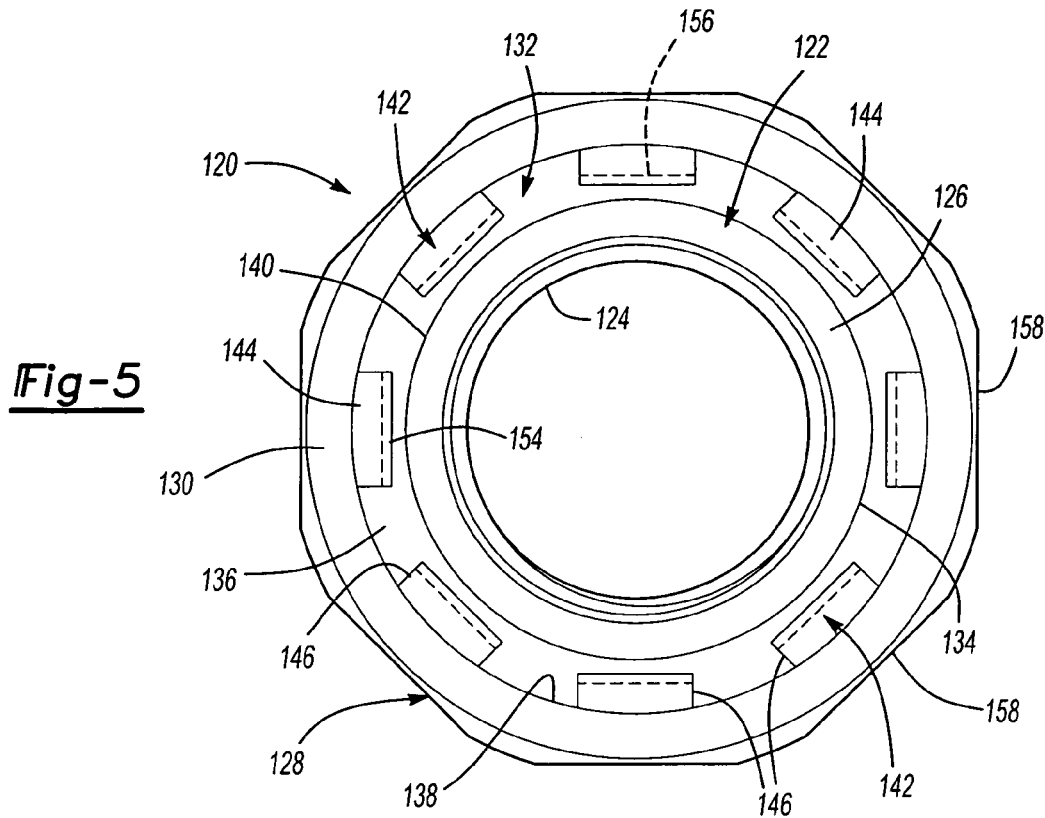
FIG. 5 is a top view of the self-attaching nut shown in FIG. 4.
Figure 6:
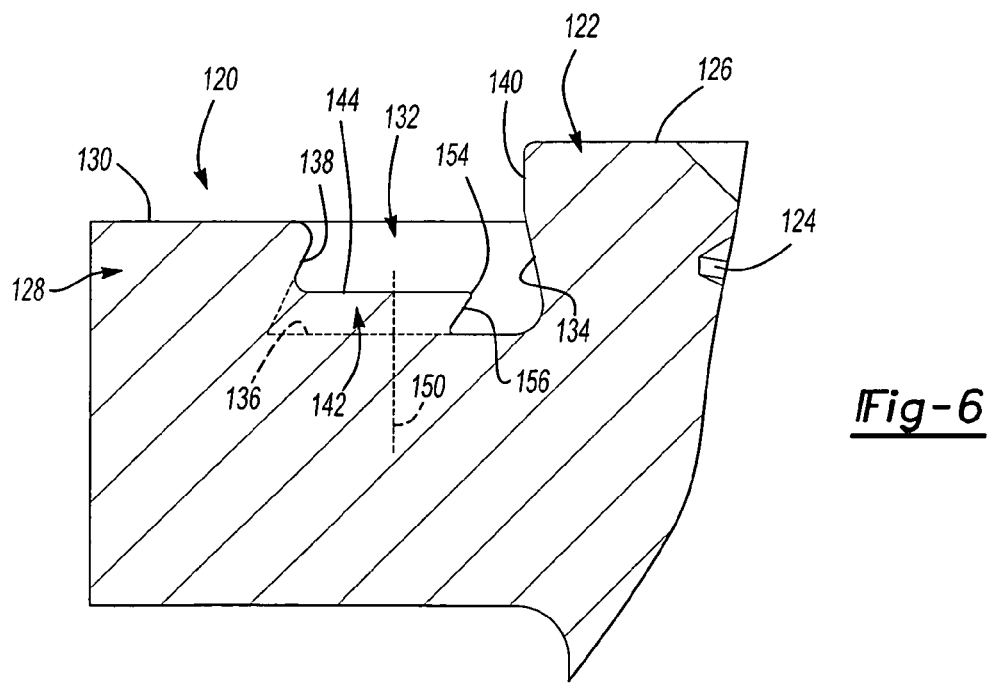
FIG. 6 is a partial side cross-sectional view of the embodiment of the self-attaching nut shown in FIGS. 4 and 5 through one of the radial ribs.

FIGS. 4 to 6 illustrate an alternative embodiment of the self-attaching nut 120 of this invention, wherein the self-attaching nut 120 is numbered in the same sequence as the self-attaching nut 20 illustrated in FIGS. 1 to 3, but in the 100 series to reduce the required description. That is, the self-attaching nut 120 includes a central pilot portion 122 having a bore 124 therethrough and an annular end face 126 surrounding the bore 124. The self-attaching nut 120 further includes a flange portion 128 having an annular end face 130 and an annular groove 132 defined in the end face 130 of the flange portion 128. The annular groove 132 includes an inner side wall 134 adjacent the pilot portion 122, a bottom wall 136, which preferably extends radially generally perpendicular to the axis of the bore 124, and an outer side wall 138 as best shown in FIG. 6. As described above, in this embodiment of the self-attaching nut 120, the inner side wall 134 is inclined radially outwardly from the bottom wall 136 and includes a cylindrical top portion 140. The outer side wall 138 is also inclined radially inwardly from the bottom wall 136 forming a dovetail-shaped annular groove as shown in FIG. 6.

This embodiment of the self-attaching nut 120 also includes a plurality of circumferentially spaced radial ribs 142. However, in this embodiment, the top faces 144 of the radial ribs 142 extend substantially parallel to the bottom wall 136 of the annular groove 132 as best shown in FIG. 6, such that the radial inner ends 154 are spaced above the plane of the bottom wall 136, spaced from the inclined inner side wall 134 and the radial inner ends 156 are inclined inwardly as shown in FIG. 6, forming a dovetail-shaped opening between the radial inner ends 156 of the radial rims 142 and the inclined inner side wall 134 of the annular groove 132 as shown in FIG. 6. Thus, during deformation of panel into the annular groove, the end portion of the panel (not shown) surrounding the opening which receives the pilot portion 122 will be deformed between the inwardly inclined end faces 156 of the radial ribs 142 and the outwardly inclined inner side wall 134 providing additional push-off strength. Further, because the area of the rectangular side faces 146 of the radial ribs 142 is greater than the triangular side faces 46 of the self-attaching nut 20 shown in FIGS. 1 to 3, it is anticipated that this embodiment of the self-attaching nut 120 will provide greater torque resistance.

As will be understood by those skilled in this art, various modifications may be made to the self-attaching nut of this invention within the purview of the appended claims. For example, in the disclosed embodiments of the self-attaching nuts, the circumferential width of the top faces 44 and 144 of the radial ribs 42 and 142 are substantially equal and the ribs are equally spaced, such that the bottom wall 36, 136 between the radial ribs adjacent the outer side wall 38, 138 is substantially equal to the circumferential width of the top faces as best shown in FIGS. 2 and 5, which is a preferred embodiment. However, the radial ribs 42, 142 may be wider or narrower depending upon the panel thickness and the application. Further, in the disclosed embodiment, the flange portion 28, 128 includes an octagonal outer surface having a plurality of outer flat surfaces 58, 158 which are utilized primarily during handling and feeding of the self-attaching nuts. However, the flange portion may also be hexagonal or any other configuration, but is preferably polygonal. As set forth above, the threaded bore 24, 124 may also be cylindrical for receipt of a self-threading or thread rolling male fastener. Having described the preferred embodiments of the self-attaching nut of this invention, the invention is now claimed, as follows.

The invention claimed is:

1. A self-attaching nut for attachment to a panel, comprising:
a central pilot portion having a bore therethrough and an annular end face surrounding said bore;
a flange portion surrounding said pilot portion including an annular end face;
an annular groove in said annular end face of said flange portion including a bottom wall spaced below a plane of said annular end face of said flange portion extending generally perpendicular to an axis of said bore, an inner side wall defining an outer surface of said pilot portion, and an inclined outer side wall inclined from said bottom wall toward said pilot portion forming a restricted opening to said annular groove adjacent said annular end face of said flange portion; and
said bottom wall of said annular groove including a plurality of circumferentially spaced radial ribs integral with said inclined outer side wall of said annular groove spaced below said annular end face of said flange portion extending radially beyond a midportion of said bottom wall including an inclined planar top face extending radially from said inclined outer side wall of said annular groove to said bottom wall spaced from said inner side wall and said pilot portion, said radial ribs including side walls extending from said inclined planar top face to said bottom wall of said annular groove, said inclined top face of said radial ribs deforming panel radially inwardly against said pilot portion.

2. The self-attaching nut as defined in claim 1, wherein said planar top faces of said radial ribs extend radially to immediately adjacent said inner side wall of said annular groove.

3. The self-attaching nut as defined in claim 1, wherein said side walls of said radial ribs are parallel and said side walls of adjacent radial ribs extend from adjacent said pilot portion to said outer side wall of said annular groove at an acute angle.

4. The self-attaching nut as defined in claim 1, wherein said radial ribs are integral with said inclined outer side wall of said annular groove above a midportion of said inclined outer side wall.

* * * * *

UNITED STATES PATENT AND TRADEMARK OFFICE
CERTIFICATE OF CORRECTION

| | | |
|---|---|---|
| PATENT NO. | : 7,112,025 B2 | Page 1 of 1 |
| APPLICATION NO. | : 11/262263 | |
| DATED | : September 26, 2006 | |
| INVENTOR(S) | : Richard P. Ward et al. | |

It is certified that error appears in the above-identified patent and that said Letters Patent is hereby corrected as shown below:

In column 6, line 27, please delete the word "therelirough" and insert the word --therethrough--.

Signed and Sealed this

Third Day of April, 2007

JON W. DUDAS
*Director of the United States Patent and Trademark Office*